Dec. 9, 1969   D. BECKER   3,482,909
MULTIFORMAT FILM PROJECTOR
Filed Sept. 15, 1967   2 Sheets-Sheet 1

United States Patent Office 3,482,909
Patented Dec. 9, 1969

3,482,909
MULTIFORMAT FILM PROJECTOR
Dietrich Becker, Stuttgart-Mohringen, Germany, assignor to Zeiss Ikon Aktiengesellschaft, Stuttgart, Germany, a corporation of Germany
Filed Sept. 15, 1967, Ser. No. 667,928
Claims priority, application Germany, Sept. 29, 1966, Z 12,443
Int. Cl. G03b 41/00
U.S. Cl. 352—79                 6 Claims

ABSTRACT OF THE DISCLOSURE

A multiformat film projector is provided with at least two selectively employable groups of structural elements, one group to be used for one type of film and another group or other groups for other types of films. Each group of elements comprises a film guide, a film carrier, a film-feed sprocket and a bottom sprocket. Each element, when attached to the projector, displaces a slidably mounted key which in turn closes a switch in the projector circuit, and unless all switches closed by the elements associated with one type of film are closed, the projector fails to operate. A warning light is provided which lights up when not all of the elements necessary for a conversion from one type of film to another type of film have been properly attached to the projector.

---

Figure 1:
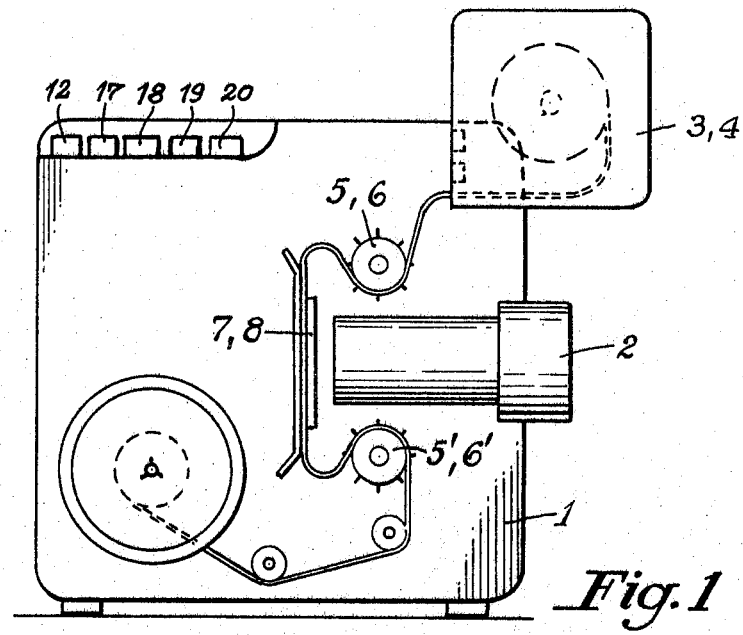

The invention relates to a multiformat film projector with at least two convertible or exchangeable structural elements, such as film guides and film carriers (reel, film holders or the like), for the purpose of changing the film format of the film to be projected.

Projectors of the described type are convertible in different ways from the projection of one type of film to the projection of another type of film.

Thus it is known, for example, to provide a projector for the purpose of conversion with exchangeable structural groups, which contain all structural elements, which during the conversion are used and are necessary. These structural groups are in each case equipped for one of the present types of film with an individual gripper, individual film feed and bottom sprockets and an individual film guide with picture window.

Less complicated are other projectors, in which different ones of these structural elements, as for example, the film feed sprocket and the film bottom sprocket are solely convertible from one position into the other. In addition to a simpler projector construction, the additional advantage is that each layman can undertake the conversion himself without any difficulty.

A disadvantage with all these prior constructions is, however, that it is left to the operator when replacing a film carrier by another one when changing the type of film to be projected to perform also the other necessary conversion steps. If this is overlooked, a destruction of the film may be the result.

It may happen, however, that the operator performs the conversion at one point, and then forgets the same at another point. In this case also the film is destroyed and under certain circumstances also parts of the projector may be damaged, as for example, the film conveying gripper.

It is an object of the invention to provide a projector in which the film format conversion is manually controlled with safety means which assure that the aforementioned disadvantages do not occur.

In accordance with the invention, this object is solved in that a multiformat projector of this type is provided with keys which extend into the range of movement of the convertible or exchangeable structural elements and scan selected forms and/or positions of these elements, dependent on the film format, and permit a projection of the film only then when a scanning position is reached which corresponds to the selected film format.

The mentioned keys may control electric switches in the current supply circuit of the projector, these switches having the different connection positions, of which one is allotted to a first, another to a second, etc., utilizable types of film, and in this manner, the current supply circuit for the projector is closable only then when all key-controlled switches are brought to the connection position corresponding to the same type of film.

The connection positions of the key-controlled switches associated with one type of film may for the purpose of being related to the connection positions of key-controlled switches associated with another type of film may be arranged in another of several current paths which are arranged parallel to one another in the current supply circuit of the projector.

According to the invention, one key each may be provided for scanning the film carrier to be mounted on the projector (spool, film holder or the like), the film guide with a picture window therein, the film feed sprocket and the bottom sprocket.

In order that the operator diagnosis correctly the failure of the projector when the conversion is not completed or is only partially completed, a warning lamp may be provided in the projector, which is associated with the keys and which then lights up as a result of its electrical connection, when the main switch of the projector is closed, and the convertible or exchangeable structural elements are adjusted wrongly for different types of film.

Finally it lies also within the scope of the invention, when the keys control individual transfer members of a mechanical gear chain, that the latter is arranged in such manner that it closes solely the projector drive in corresponding adjusted positions for one type of film.

In the following, the invention is explained more in detail in an embodiment by way of example, from which further features clarifying the construction are recognizable. In the drawing certain details not essential to the invention are omitted in favor of better comprehension.

Figure 2:
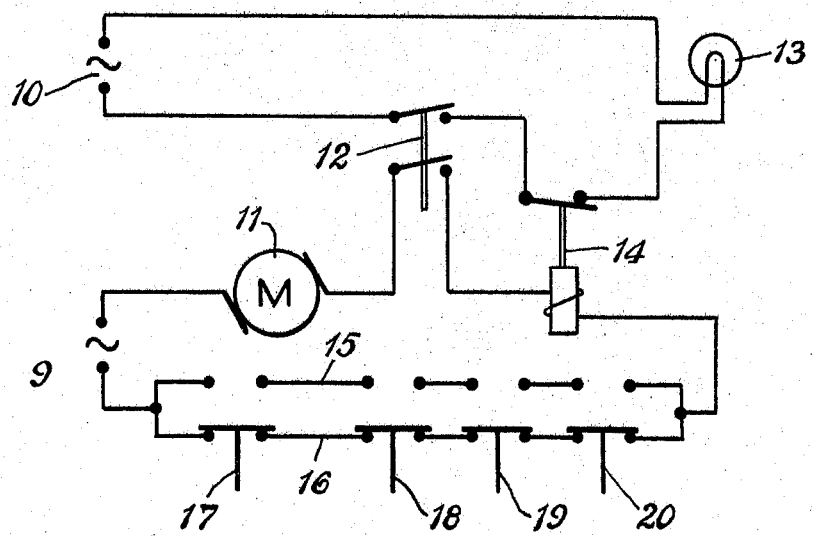
Figure 3:
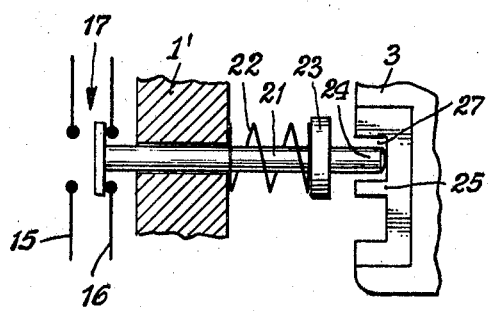
Figure 4:
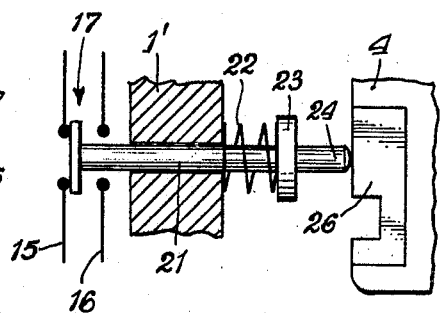
Figure 5:
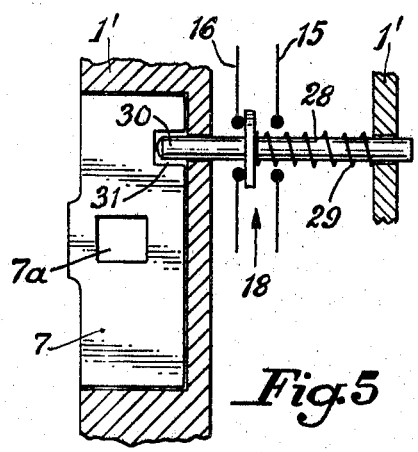
Figure 6:
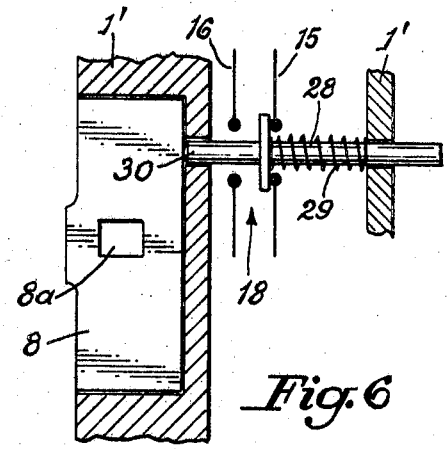
Figure 7:
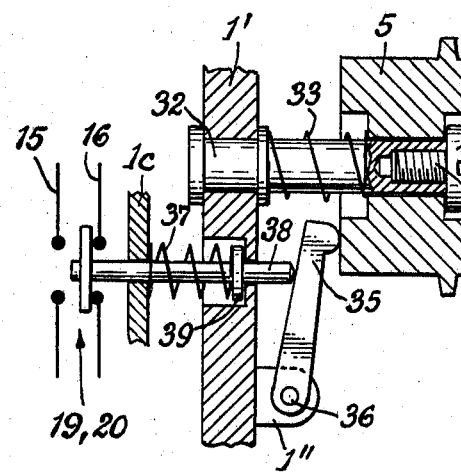
Figure 8:
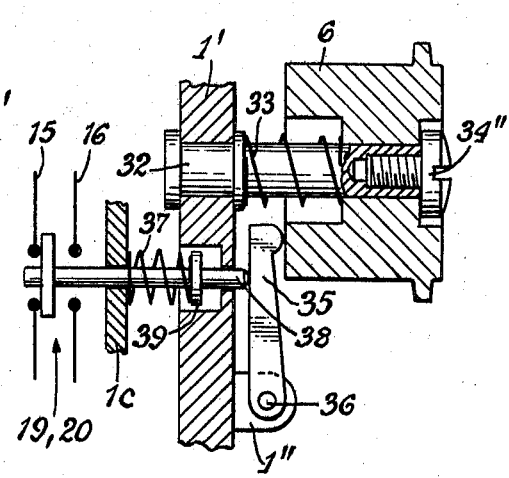

In the drawings:

FIG. 1 discloses a small film projector with attachable film carriers, exchangeable feed sprocket and bottom sprocket and an exchangeable film guide with picture window;

FIG. 2 discloses diagrammatically an electric safety switch arrangement with a warning lamp;

FIGS. 3 and 4 disclose each details of the key-controlled switch with film carrier (film holder);

FIGS. 5 and 6 disclose each details of the key-controlled switch for the film guide with picture window; and FIGS. 7 and 8 disclose each details of the key-controlled switch for the film conveyor sprockets (feed sprocket and bottom sprocket).

Referring to FIG. 1 of the drawing, a projector 1 with an objective 2 is provided with holders for interchangeable structural elements, film holders 3 or 4, feed and bottom sprockets 5 or 6 and film guide 7 or 8.

The circuit diagram illustrated in FIG. 2 shows two alternating voltage sources 9 and 10, one for the warning lamp 13 and one for the projector motor 11. There is also illustrated a main switch 12, a magnet switch 14 and between two parallel current paths 15 and 16 are arranged key-controlled switches 17, 18, 19 and 20 switchable to and fro. The switch 17 is associated with the film holders 3 and 4, the switch 18 is associated with the film guides 7 and 8 and the switches 19 and 20 are associated with the feed sprockets 5 and 6 and with the bottom sprockets 5' and 6', respectively. If, as shown in FIG. 2, the switches 17 to 20 are all arranged in the lower current path 16, then the projector 1 is adjusted to super-8-small film. The connection of the switches 17 to 20 in the upper current path 15 corresponds to the adjustment for double-8-small film.

If not all of the switches 17 to 20 are closed in the same current path 15 or 16, the current supply circuit for the projector motor 11 cannot be closed with the main switch 12. The magnet coil winding of the magnet switch 14 remains without current and the magnet cannot open the switch 14. Therefore, the supply circuit for the warning lamp 13 is closed and is energized by the alternating voltage source 10 over the main switch 12, the magnet switch 14 and the warning lamp 13 back to the alternating voltage source 10. The warning lamp 13 remains lit and shows that the projector is not running, because it is not properly adjusted in all parts to the same type of film. Both a complete disregard of a conversion upon attachment, for example of a film holder 4 with double-8-film instead of a film holder 3 with super-8-film as well as also the omission of the conversion of only one of the other structural elements necessarily to be converted, operates in this manner.

If, for example, the projector 1 has not been used for a longer period of time, one will notice at the latest when it is connected, whether it is adjusted for the attached film holder 3, 4 or not. The warning lamp 13 remains lit as long as any one of the structural elements to be converted or interchanged, respectively, has not been converted or interchanged.

If all of the switches 17 to 20 are closed in the same current path 15 or 16, then upon closure of the main switch 12, the current supply circuit for the projector motor 11 will also be closed. The magnet winding of the magnet switch 14 is energized by the current and opens its magnet switch 14. Thereupon, the projector 1 operates and the warning lamp 13 remains without current.

The details described with reference to the FIGS. 3 to 8, show the control of the switches 17, 18, 19 and 20 by means of individual keys, which on their part respond to changes in form of the convertible or interchangeable structural elements and/or their changes of position.

In accordance with the FIGS. 3 and 4, the switch 17 is connected with an axially movable rod-shaped key 21 mounted in a wall 1' of the projector 1. The key is surrounded by a spring 22, one end of which engages the wall 1', while the other end engages a collor 23 fixedly mounted on the key 21. The spring 22 always tends to hold the key 21 in a position, in which the switch 17 is closed in the current path 16, and accordingly is set for the projection of a super-8-film. The film holders 3 or 4, upon attachment to the projector 1 enter with their outer contours into the field of movement of the tip 24 of the key 21. Both film holders 3 and 4 possess switch bars 25 and 26, respectively.

The film holder 3 for super-8-film shown in FIGS. 3 is provided with the switch bar 25, which has in the range of the tip 24 of the key 21 a recess 27 and thus does not influence the position of the key 21.

FIG. 4 shows a film holder 4 for double-8-film, while the film holder 3 is used for super-8-film. The switch bar 26 is not recessed in the area of the tip 24 of the key 21. Therefore, the key 21 is urged into a position in which it connects the switch 17 in the current path 15 and adjusts the projector to a projection of double-8-film.

In FIGS. 5 and 6 the scanning connected with the film guides 7 and 8 is illustrated.

The switch 18 is movable to and fro between the current paths 15 and 16 and is associated with a rod-shaped key 28, which simultaneously in manner not shown here, effects a conversion of the film conveying gripper of the projector 1. The key 28 is urged by a spring 29 surrounding it likewise in a position corresponding to the adjustment of the projector for super-8-film. The switch 18 accordingly is connected in the current path 16. The tip 30 of the key 28 projects into the space where the film guides 7 and 8 are arranged. The film guide 7 for a super-8-film possesses, in similar manner as the switch bar 25, in the area of the tip 30 of the key 28 a recess 31. The key 28 and therewith the switch 18 remain untouched upon attachment of the film guide 7 which is used for a super-8-film (FIG. 5).

Upon attachment of the film guide 8, however, which is used for double-8-film, the key 28 is axially displaced, because the film guide 8 does not have a recess 31. The key 28 converts the film conveying gripper and brings the switch 18 into an adjustment of the projector for projecting a double-8-film, in which position the switch is connected in the current path 15. The picture windows in the film guides are designated with 7a and 8a, respectively.

FIGS. 7 and 8 illustrate the operation of the switches 19 and 20.

On a shaft 32 fixed with one end in the projector housing are mounted either the sprocket 5 for a super-8-film or the sprocket 6 for a double-8-film. A helical spring 33 surrounds the shaft 32 between the projector wall 1' and one end of the sprocket and urges the latter against the head 34' of a screw 34 inserted in one end of the shaft 32.

The rear end face of the particular sprocket 5 or 6 attached to the shaft 32 is engaged by a scanning lever 35, which is pivoted at 36 to a wall bracket 1" and is engaged between its ends by an axially movable key pin 38 surrounded by a pressure spring 37. One end of the spring 37 engages a collar 39 on the pin 38, while the end of the spring 37 engages a wall 1c. The parts 37, 38, 39 form a part of the switch 19 or 20.

Each one of the film feed sprockets 5, 6 and the bottom sprockets 5', 6' are provided with the same control arrangement just described.

With the sprocket 5 are associated the switches 19 and 20 in the current path 16 and thereby the projector is adjusted for super-8-film.

The sprocket 6 (FIG. 8) is wider than the sprocket 5 and therefore displaces the scanning lever 35 toward the left. The lever 35 moves the key pin 38 toward the left and connects the switch 19 or the switch 20, respectively (switch 19 on the film feed sprocket, and switch 20 on the bottom sprocket) into the current path 15, which conversion effects an adjustment of the projector for projecting a double-8-film.

What I claim is:

1. A multiformat film projector with at least two selectively employable groups of structure elements, one group for each film format to be projected, each group comprising a film guide, a film carrier, a film feed sprocket and a film bottom sprocket, and means for converting said projector for selectively projecting one of said film formats, said means comprising movably arranged keys, one for each two similar elements in each said groups, each said elements when mounted on said projector having predetermined differentiating portions, adapted to be engaged by said keys, each said portions being associated with one of said film formats, and means for permitting an operation of said projector only when all keys engage portions of said elements associated with the selected film format.

2. A multiformat film projector according to claim 1, including means forming an electric circuit, an electric motor for driving said projector arranged in said electric circuit, said electric circuit including two parallel circuit paths and electric switches arranged in series in said paths, one of said circuit paths being associated with one group of said structural elements, and the other one of said circuit path being associated with the other group of said structural elements, there being arranged as many electric switches as there are structural elements in each one of said groups of structural elements, each one of said keys being adapted to open and close one of said switches in said two parallel circuit paths, whereby said circuit of said motor is closed only when said switches close one of said parallel circuit paths.

3. A multiformat film projector with at least two selectively employable groups of structural elements, one group for each film format to be projected, each group comprising a film guide, a film carrier, a film feed sprocket and a film bottom sprocket, and means for converting said projector for selectively projecting one of said film formats, said means comprising movably arranged keys, one for each two similar elements in each said groups, each said elements when mounted on said projector having predetermined differentiating portions, adapted to be engaged by said keys, each said portions being associated with one of said film formats, means for permitting an operation of said projector only then when all keys engage portions of said elements associated with the selected film format, and means forming an electric circuit, an electric motor for driving said projector arranged in said electric circuit, said electric circuit including two parallel circuit paths and electric switches arranged in series in said paths, one of said circuit paths being associated with one group of said structural elements, and the other one of said circuit path being associated with the other group of said structural elements, there being arranged as many electric switches as there are structural elements in each one of said groups of structural elements, each one of said keys being adapted to open and close one of said switches in said two parallel circuit paths, whereby said circuit of said motor is closed only when said switches close one of said parallel circuit paths.

4. A multiformat film projector according to claim 3, including a warning light controlled by said electric circuit and adapted to light up when any one of said serially arranged switches is open.

5. A multiformat film projector according to claim 3, including a main switch in said electric circuit, and means forming another electric circuit, a warning light in said other circuit, said other circuit being closed by said main switch when said main switch is closed, and a magnet switch in said other circuit, said magnet switch having a coil which is energized by said first named circuit when the projector is operating, so that said other circuit is opend by said magnet switch and the warning light remains dark.

6. A multiformat film projector according to claim 1, in which said film guide and said film carrier are each provided with a recess into which the respective keys are adapted to enter when said projector is adjusted to one of said film formats.

References Cited

UNITED STATES PATENTS

| | | | |
|---|---|---|---|
| 2,737,083 | 3/1956 | Dowling | 352—79 |
| 3,374,707 | 3/1968 | Johnson et al. | 352—80 X |

NORTON ASHER, Primary Examiner

R. A. WINTERCORN, Assistant Examiner

U.S. Cl. X.R.

352—80